(12) United States Patent
Mohammed et al.

(10) Patent No.: US 12,493,065 B2
(45) Date of Patent: Dec. 9, 2025

(54) METHOD AND AN APPARATUS FOR CONVERTING AN INPUT FREQUENCY TO A VOLTAGE SIGNAL USING A PASSIVE FILTER

(71) Applicant: KING FAHD UNIVERSITY OF PETROLEUM AND MINERALS, Dhahran (SA)

(72) Inventors: Anas Saleh Mohammed, Dhahran (SA); Yaqub Alhussain Mahnashi, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 87 days.

(21) Appl. No.: 18/581,218

(22) Filed: Feb. 19, 2024

(65) Prior Publication Data
US 2025/0264508 A1 Aug. 21, 2025

(51) Int. Cl.
*G01R 23/06* (2006.01)
*G01R 19/25* (2006.01)
*H03H 11/04* (2006.01)

(52) U.S. Cl.
CPC ......... *G01R 23/06* (2013.01); *G01R 19/2506* (2013.01); *H03H 11/04* (2013.01)

(58) Field of Classification Search
CPC ..... G01R 23/06; G01R 19/2506; H03H 11/04
See application file for complete search history.

(56) References Cited

U.S. PATENT DOCUMENTS

| 4,032,852 A | 6/1977 | Hulls et al. | |
|---|---|---|---|
| 2009/0168924 A1* | 7/2009 | Gomez | H04B 1/18 375/340 |
| 2011/0260741 A1* | 10/2011 | Weaver | G06F 3/0446 29/829 |
| 2014/0009176 A1* | 1/2014 | Saeedi | G09G 3/006 324/681 |

(Continued)

OTHER PUBLICATIONS

Various authors, "Discrete frequency to voltage converter?", https://www.edaboard.com/threads/discrete-frequency-to-voltage-converter.337795/, accessed 2023, all pages (Year: 2023).*

(Continued)

*Primary Examiner* — Daniel C Puentes
(74) *Attorney, Agent, or Firm* — Oblon, McClelland, Maier & Neustadt, L.L.P.

(57) ABSTRACT

A method and apparatus for converting an input frequency to a voltage signal using a passive band-pass filter. The method includes providing an input signal having a specified frequency and amplitude to a passive band-pass filter. The method also includes obtaining an attenuated signal corresponding to the input signal from the passive band-pass filter. The method also includes providing the attenuated signal to a peak detector to obtain a direct current (DC) signal having an output voltage proportional to the specified frequency. The passive circuitry includes a first circuit to receive an input signal having a specified frequency and amplitude, and output an attenuated signal corresponding to the input signal. The passive circuitry also includes a second circuit to convert the attenuated signal to a DC signal having an output voltage proportional to the specified frequency.

20 Claims, 7 Drawing Sheets

(56) References Cited

U.S. PATENT DOCUMENTS

| | | |
|---|---|---|
| 2014/0254694 A1* | 9/2014 | Okada .................... H04B 3/56 375/258 |
| 2014/0266420 A1 | 9/2014 | Brown et al. |
| 2020/0011912 A1 | 1/2020 | Quan |

OTHER PUBLICATIONS

Lukocius et al. ; Physiological Parameters Monitoring System for Occupational Safety ; Elektronika IR Elektrotechnika, vol. 20, No. 5 ; Mar. 14, 2014 ; 4 Pages.

Elton ; Analyzation of the Resistor-Inductor-Capacitor Circuit ; Undergraduate Journal of Mathematical Modeling: One + Two, vol. 7 ; 2017 ; 21 Pages.

* cited by examiner

METHOD AND AN APPARATUS FOR CONVERTING AN INPUT FREQUENCY TO A VOLTAGE SIGNAL USING A PASSIVE FILTER

STATEMENT OF PRIOR DISCLOSURE BY AN INVENTOR

Aspects of the present disclosure were described at the Tenth International Conference on Electrical and Electronics Engineering ("A Broadband Frequency-to-Voltage Converter for Sinusoidal Signals Based on Filters Design," ICEEE 2023, pp. 85-89), the entire contents of which are incorporated herein by reference.

STATEMENT OF ACKNOWLEDGEMENT

Support from King Fahd University of Petroleum & Minerals (KFUPM) and the Center for Communication Systems and Sensing is gratefully acknowledged.

BACKGROUND

Technical Field

The present disclosure is directed to a method and an apparatus for converting an input frequency to a voltage signal using a passive filter.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Frequency-to-voltage converters (FVC) are used to generate an output voltage level proportional to the frequency of an input signal. These converters are used extensively in various applications, including communication, biomedical devices, instrumentation and measurement systems, power control, etc. Typically, FVCs are developed to satisfy several design requirements, such as high speed, low-output ripple, good linearity, and wide frequency range, with a high degree of trade-offs. One major disadvantage of these devices is the use of active components, which are typically complex and require a power supply. In addition, FVCs are designed to ensure linear proportionality between the frequency of the input signal and the output voltage level. Two of the most prevalent topologies of FVCs, where most of the implemented designs in the literature fall into their categories, are counter-based and integrator-based or differentiator-based converters. The counter-based method uses synchronous digital circuitry and is able to achieve high accuracy. For this technique, the number of clock cycles elapsed in one period of the input signal is counted and then interpreted into a DC level to be processed.

Further developments in phase-locked loop (PLL) devices required integrating FVCs in their design as one of the main components. PLL devices have numerous applications where automatic control of frequency or phase is needed. In a PLL, the output signal must track the input signal and synchronize together in both frequency and phase. The FVC architecture integrated with PLL used is built upon the charge redistribution principle between two or more identical capacitors, utilizing a set of fast transistors to work as switches, essentially to control the charging and discharging time. Although this method proved to be sufficient with square waves or train of pulses as input signal, it was not tested for sinusoids. In general, many FVCs in the literature contain RLC networks or low-pass filters (LPF), which depend on voltage decaying response when the frequency of the signal changes and utilize this decaying response to link the frequency to the voltage level. The majority of sinusoidal FVCs have a narrow frequency range of conversion since most of them are noise-limited when running at frequencies greater than 100 kHz.

Each of the aforementioned prior art suffers from one or more drawbacks hindering their adoption. Accordingly, it is one object of the present disclosure to provide a method and an apparatus for converting an input frequency to a voltage signal using a passive filter.

SUMMARY

In an exemplary embodiment, a method for converting an input frequency to a voltage signal using a passive filter (e.g., passive band-pass filter) is described. The method includes providing an input signal having a specified frequency and amplitude to a passive band-pass filter. The passive band-pass filter is configured to have a pass band of a specified frequency range. The method also includes obtaining an attenuated signal corresponding to the input signal from the passive band-pass filter. The method also includes providing the attenuated signal to a peak detector to obtain a direct current (DC) signal having an output voltage proportional to the specified frequency.

In another exemplary embodiment, a method for converting an input frequency to a voltage signal using a passive filter is described. The method includes providing an input signal having a specified frequency and amplitude to a passive filter. The passive filter is configured to attenuate the input signal based on the specified frequency satisfying a specified frequency criterion. The method further includes obtaining an attenuated signal corresponding to the input signal from the passive filter. The method further includes providing the attenuated signal to a peak detector to obtain a direct current (DC) signal having an output voltage proportional to the specified frequency.

In another exemplary embodiment, an apparatus for converting an input frequency to a voltage signal using passive circuitry is described. The passive circuitry includes a first circuit to receive an input signal having a specified frequency and amplitude, and output an attenuated signal corresponding to the input signal. The passive circuitry also includes a second circuit to convert the attenuated signal to a direct current (DC) signal having an output voltage proportional to the specified frequency.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
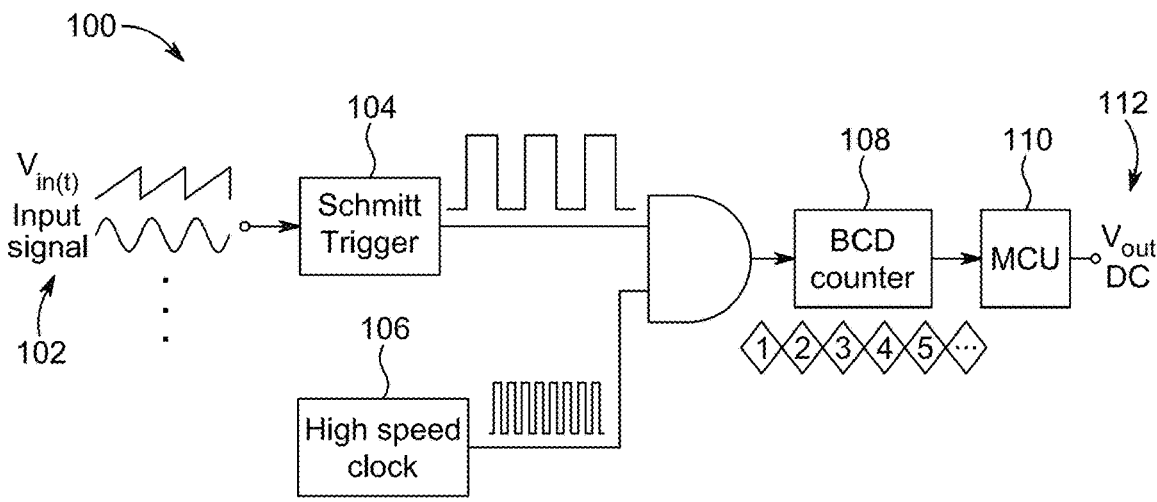
FIG. 1 (PRIOR ART) depicts a counter-based conversion method where cycles are counted and interpreted as a voltage DC level, according to an exemplary scenario.

In the drawings, like reference numerals designate identical or corresponding parts throughout the several views. Further, as used herein, the words "a", "an" and the like generally carry a meaning of "one or more", unless stated otherwise.

Furthermore, the terms "approximately," "approximate", "about" and similar terms generally refer to ranges that include the identified value within a margin of 20%, 10%, or preferably 5%, and any values therebetween.

Frequency-to-voltage converters (FVC) are used to generate an output voltage level proportional to the frequency of an input signal. These converters are used extensively in various applications, including communication, biomedical devices, instrumentation and measurement systems, power control, etc. FVCs are developed to satisfy several design requirements, such as high speed, low-output ripple, good linearity, and wide frequency range, with a high degree of trade-offs. One major disadvantage of these devices is the use of active components, which are typically complex and require a power supply. In addition, FVCs are designed to ensure linear proportionality between the frequency of the input signal and the output voltage level. However, the present technology reveals that most of the present FVCs operate in the low-frequency range, generally hundreds of hertz (Hz) to a few megahertz (MHz). Following the advancement in complementary metal-oxide semiconductor (CMOS) technology, which is a predominant technology in the field of electronics for the manufacturing of integrated circuits, many designs focus on the use of CMOS technology to improve several operational aspects of FVCs. These aspects include extending the range of operation from hundreds of MHz up to a few gigahertz (GHz), which is due to their high switching speed. Also, their high noise immunity, along with their optimized designs, leads to efficient system performance. Two of the most prevalent topologies of FVCs, where most of the implemented designs in the literature fall into their categories, are counter-based and integrator-based or differentiator-based converters. The counter-based method uses synchronous digital circuitry and is able to achieve high accuracy. For this technique, the number of clock cycles elapsed in one period of the input signal is counted and then interpreted into a DC level to be processed. On the other hand, the integrator-based or differentiator-based eliminates the need for high-speed clocks to operate, and takes advantage of the mathematical characteristics of periodic signals, especially sinusoidal signals. This method depends on extracting the frequency out by integrating or differentiating the incoming signal to affect its amplitude without the need for fast clocks.

The FVC is a versatile circuit that translates variations in frequency to a corresponding voltage level. However, converting high-frequency signals into a DC output voltage has been a challenging task. The disclosure provides an approach for converting the frequency into a DC output voltage of sinusoidal signals. The frequency-to-voltage conversion is achieved by utilizing the attenuation band of a filter. The technology provides a clear mathematical model and a relation between frequency and DC output voltage levels, with merely passive components for efficient power consumption. This technique is implemented to achieve wide frequency spectrum conversion that could extend to tens of MHz and beyond. The present scheme is verified experimentally in both low-frequency ranges, varying in sub-kilohertz, and as high as 40 MHz.

Aspects of this disclosure are directed to a method for converting an input frequency to a voltage signal using a passive filter (e.g., passive band-pass filter) is described. The method includes providing an input signal having a specified frequency and amplitude to a passive band-pass filter. The passive band-pass filter is configured to have a pass band of a specified frequency range. The method also includes obtaining an attenuated signal corresponding to the input signal from the passive band-pass filter. The method also includes providing the attenuated signal to a peak detector to obtain a DC signal having an output voltage proportional to the specified frequency.

FIG. 1 (PRIOR ART) depicts a counter-based conversion circuit 100 where cycles are counted and interpreted as a voltage DC level, according to an exemplary scenario. At first, an analog periodic signal passes through the Schmitt trigger 104 to be converted into a square signal, with the same frequency fin as the input signal 102. Then, both the square signal and fast clock pulses from high-speed clock 106 pass through the AND gate. The output would be a repetition of numerous clock cycles with a speed of fin. As a result, the Binary Coded Decimal (BCD) counter 108 will count the input clock cycles. The output is now input to a microcontroller 110, which processes these pulses and gives a proportional DC output voltage 112. However, this approach needs high-speed clocks, as seen in FIG. 1. The clock speed must be higher than the frequency or the speed of the input signal, limiting its application by limiting the maximum frequency of input signals that can be processed.

Figure 2:
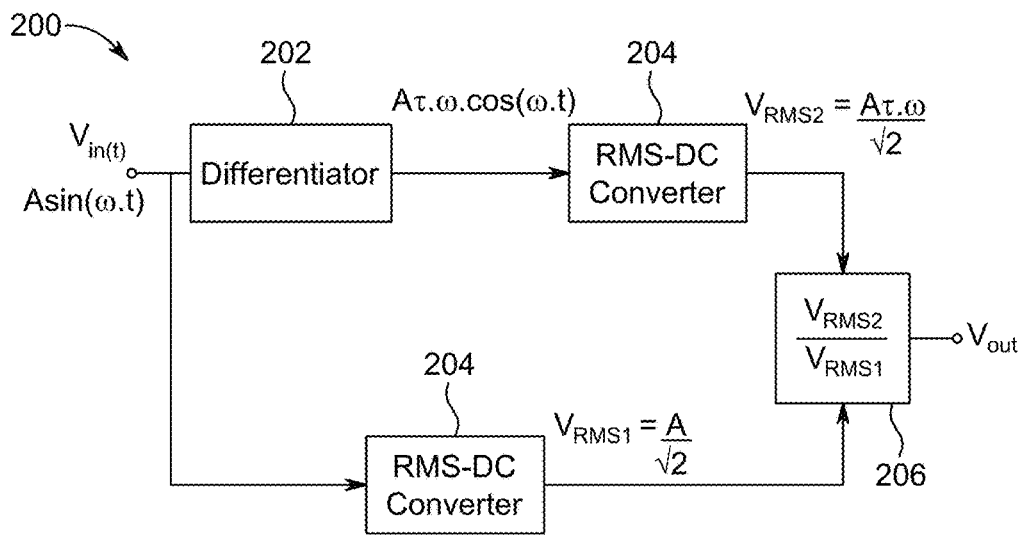
FIG. 2 (PRIOR ART) depicts the basic principle of a differentiator-based Frequency-to-Voltage Converter (FVC), according to an exemplary scenario.

FIG. 2 (PRIOR ART) depicts a basic principle of a differentiator-based Frequency-to-Voltage Converter (FVC) 200, according to an exemplary scenario. On the other hand, the integrator-based or differentiator-based eliminates the need for high-speed clocks to operate and takes advantage of the mathematical characteristics of periodic signals, especially sinusoidal signals. This method depends on extracting the frequency out by integrating or differentiating the incoming signal to affect its amplitude and without the need for fast clocks. For instance, if the input signal is assumed to be a sinusoidal wave with an amplitude of ±A, then the output of the differentiator 202 would be a sinusoidal function with an amplitude of $\pm A_{r\omega}$, where $\omega$ is the extracted frequency of the incoming signal and t is the gain of the differentiator. Suppose the gain τ is chosen small enough to be compatible with the frequency of operation, and the RMS-DC value 204 of the original and the differentiated signal are divided 206. In that case, $V_{out}$ equals to $k_{\tau\Omega}$, where k is the divider gain, and the output is directly proportional to the input frequency. However, this method has vital accuracy limitations caused by the non-linearities in the differentiation circuit.

Figure 3:
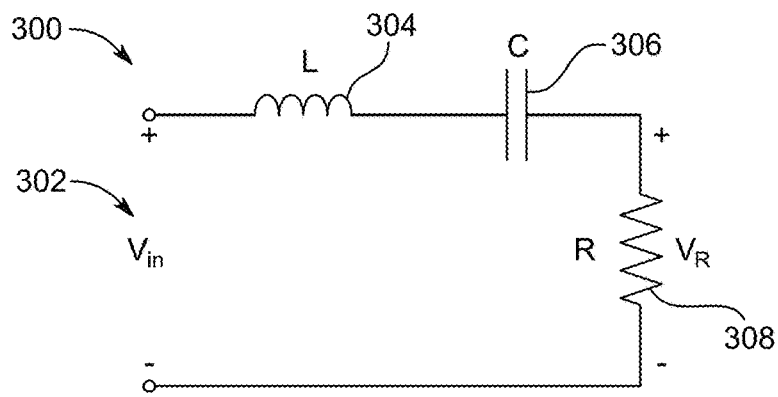
FIG. 3 depicts a circuit realization for an RLC band-pass filter, according to certain embodiments.

FIG. 3 depicts a circuit realization for an RLC band-pass filter 300, according to certain embodiments. Choosing suitable filters for specific applications is sometimes a cumbersome task, since there are various types, and could be passive or active filters, with several methods to analyze such circuits. Notably, passive filters save a considerable amount of power, unlike complex active filters. Therefore, the use of passive filters as FVCs would give a clear relation between frequency and voltage levels, with well-constructed equations of the transfer function and main parameters of the filter used. The passive RLC band-pass filter 300 shown in FIG. 3 is used to verify the approach. Band-pass filters have two attenuation regions, and both can be utilized as FVCs, thus, extending the operational frequency range. The voltage Vin 302 is provided to inductance L 304, capacitor C 306, and resistor R 308 with resistor voltage VR.

The following equations represent the main parameters of the band-pass filter 300 shown in FIG. 3. Where Eq. (1) is the transfer function, Eq. (2) is the center frequency, Eq. (3) represents the low and high cut-off frequency, Eq. (4) for the bandwidth, and lastly Eq. (5) is the expression for the Q factor, which interferes with the bandwidth and determines the flattened range of the filter and the distance between cut off frequencies ($\omega_{c1}$, $\omega_{c2}$).

$$T(s) = \frac{V_R(s)}{V_{in}(s)} = \left(\frac{R}{L}\right)\frac{s}{s^2 + s\left(\frac{R}{L}\right) + \frac{1}{LC}}, \quad \text{Eq. (1)}$$

$$\omega_0 = \frac{1}{\sqrt{LC}}, \quad \text{Eq. (2)}$$

$$\omega_{c1}, \omega_{c2} = \sqrt{\left(\frac{R}{2L}\right)^2 + \frac{1}{LC}} + \frac{R}{2L}, \quad \text{Eq. (3)}$$

$$BW = \omega_{c1} - \omega_{c2} = \frac{R}{L}, \quad \text{Eq. (4)}$$

$$Q = \frac{\omega_0}{BW} = \frac{1}{R}\sqrt{\frac{L}{C}}. \quad \text{Eq. (5)}$$

Figure 4:
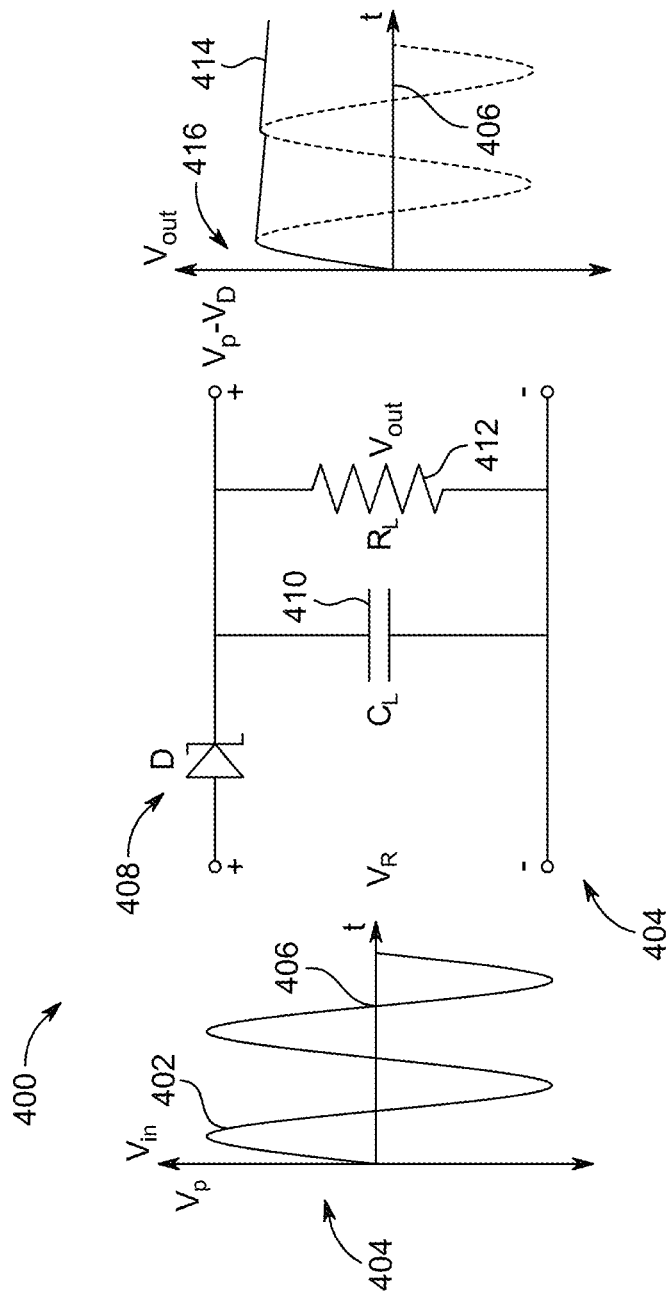
FIG. 4 depicts a peak detector circuit, according to certain embodiments.

FIG. 4 depicts a peak detector circuit 400, according to certain embodiments. The output of a filter is an attenuated version of the original sinusoidal input signal 402 with respect to voltage $V_P$ 404 and time 406. Rectifying the filtered signal by means of a simple half-wave rectifier is required by using diode 408, as a basic principal of an FVC is to generate a DC voltage proportional to the frequency of an input signal. Consequently, voltage ripples are generated instead of a smooth steady-state DC output voltage. Thus, a capacitor 410 is employed to minimize the ripple factor experienced at the output voltage as shown in FIG. 4. Also, the resistive load, $R_L$ 412, has some effects on the ripple factor.

The output voltage 414 of the peak detector circuit 400 shown in FIG. 4 depends on the charging and discharging of the capacitor CL 410. The capacitor 410 in the first quarter of the positive cycle charges up to the maximum voltage $V_P$–$V_D$, as the forward bias voltage of the diode 408 is subtracted from the input maximum voltage $V_P$ 416. In the second quarter, the diode becomes reverse biased and the capacitor 410 passes current to the resistor $R_L$ 412 for the remainder of the cycle until the supply voltage exceeds the capacitor voltage, and this process repeats in each cycle. Due to the parallel load resistance $R_L$ 412, and if the time constant ($\tau=R_L C_L$) is far greater than the input signal period T, then the capacitor charges rapidly throughout the filtering process, and discharges at a slower rate. This results in an undesirable output voltage fluctuation, called ripple voltage, as defined in equation (6). The ratio of the output peak-to-peak ripple voltage to DC voltage as defined in equation (7), is called the ripple factor γ. The ripple factor is used to measure the effectiveness of the smoothing circuit and the output DC voltage 414 purity. Where a small ripple factor γ indicates the purity of the output DC voltage, and larger γ rates refers to unsteady output voltage.

$$V_{r(p-p)} = \frac{V_P - V_D}{fR_L C_L}, \quad \text{Eq. (6)}$$

$$\gamma = \frac{V_{r(p-p)}}{V_{DC}}. \quad \text{Eq. (7)}$$

Figure 5:
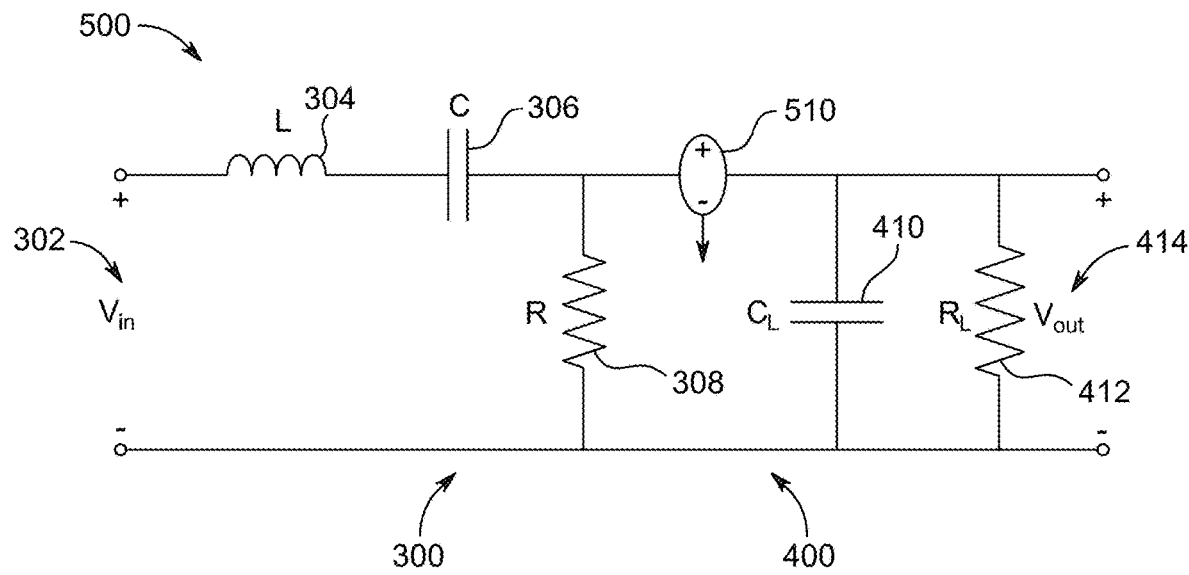
FIG. 5 depicts a sinusoidal frequency to voltage converter system, according to certain embodiments.

FIG. 5 depicts a sinusoidal frequency to voltage converter system 500 of the present technology, according to certain embodiments. The present system depicted in FIG. 5 is composed of mere passive components, constructing a band-pass filter 300 as a first stage, followed by a peak detector circuit 400 in the second stage. When a sinusoidal wave passes through a filter, it is either located in the pass band or the attenuation band of the filter. By taking advantage of the attenuation band, the output of the filter is an attenuated form of the same transmitted signal. In the second stage, the signal is changed from being a sinusoidal signal, to a DC constant form. This outcome is similar to the response of an FVC, in a way that varying the frequency of a signal results in changing the output DC voltage level. The independence of the filter parameters and the peak detector circuit stage 400 adds more cohesion to the system. Thus, both stages have little interference with each other, and the input source impedance here imposes almost no error as compared to the magnitude of the filter resistor R 308. In some embodiments, the amplitude of the input signal is larger than the forward biasing voltage of the diode 408 used, to permit the natural flow of current after the filter attenuates the input signal.

In an implementation, an apparatus 500 for converting an input frequency to a voltage signal using passive circuitry is described. The passive circuitry includes a first circuit 300 to receive an input signal 302 having a specified frequency and amplitude, and output an attenuated signal corresponding to the input signal 402. In an implementation, the first circuit 300 includes a passive filter (e.g., passive band-pass filter). The passive filter is configured to attenuate the input signal 302 based on the specified frequency satisfying a specified frequency criterion. In an implementation, the passive filter is a passive band-pass filter that is configured to attenuate the input signal 302 based on the specified frequency being outside of a specified frequency range. The passive circuitry also includes a second circuit 400 to convert the attenuated signal 402 to a direct current (DC) signal 414 having an output voltage proportional to the specified frequency. In an implementation, the second circuit 400 is a peak detector that is configured to output peak voltage 404 of the attenuated signal 402. In an implementation, the peak detector is configured to reduce a ripple factor of the output voltage 414. The ripple factor is indicative of a fluctuation in the output voltage 414. In an implementation, the peak detector includes a resistor and a capacitor, and at least one of the capacitor 410 or resistor 412 values is adjusted to reduce the ripple factor. In an implementation, the peak detector further includes a voltage source to bias a rectifier of the peak detector.

Figure 6:
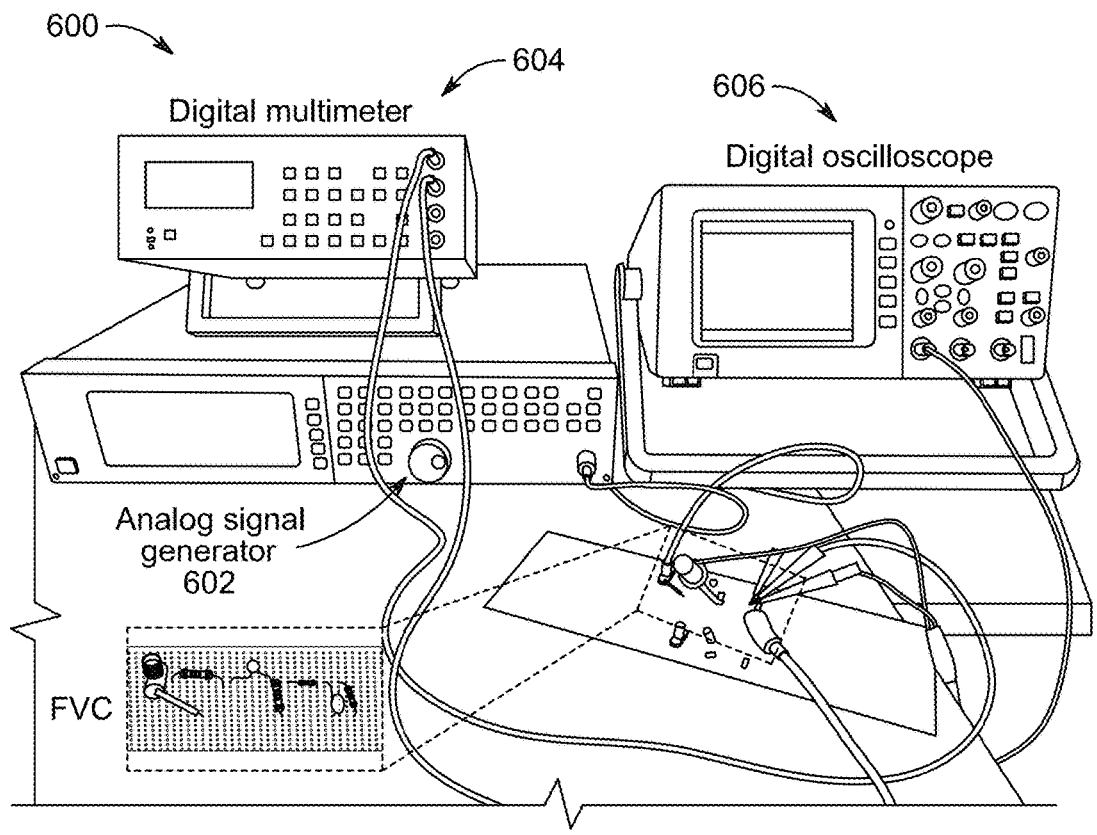
FIG. 6 depicts an experimental setup of the present frequency to voltage converter system, according to certain embodiments.

FIG. 6 depicts an experimental setup of the present FVC 600, according to certain embodiments. To concretize the approach, the present FVC system 500 shown in FIG. 5 is tested and verified experimentally in both low-frequency ranges, varying in sub-kHz, and as high as 40 MHz. These ranges are chosen based on the available equipment and components, which could be extended easily to higher ranges of operation, depending on the desired application. The experimental testbed circuit 600 shown in FIG. 6 includes an analog signal generator 602, a digital oscilloscope 606, and a digital multimeter 604. The circuit 600 uses basic pin-through hole (PTH) components, and this circuit is merely built for testing in the low-frequency band, that is lower than 2 MHz. A sinusoidal signal with an amplitude of 2V generated from the analog signal generator 602 is input to the present FVC system, the digital oscilloscope 606 is used to clearly show the output DC voltage, while the digital multimeter 604 is used to accurately measure the output DC voltage after the peak detection stage. The filter circuit components L 304, C 306, and R 308 values are chosen to be 1 mH, 1 μF, and 2Ω, respectively, all with ±5% tolerance. The diode 408 used in this stage is a small signal diode (For example, 1N4148). The capacitor CL 410 and resistance RL 412 values in this stage are chosen to give a slow discharging rate, these values are 1 nF and 5.1 MΩ, respectively. In several embodiments, the filter component values are determined based on desired parameter values. Therefore, the filter parameters from equations (2)-(5) are based on the values of the components are as follows: $f_0$=5.03 kHz, $f_{c1}$=78 Hz, $f_{c2}$=318.39 kHz, BW=318.31 kHz, and Q=0.016.

The system 600 is further tested using the same setup as shown in FIG. 6, but with the present system printed on a PCB. Designing the present system on a PCB is an enabler for better component options, with minimal tolerances and high-frequency durability, leading to more accurate results at higher frequency bands. The purpose of this test is to verify the applicability of the present system approach of using filters at high frequencies and to also examine the feasibility of using the two bands of a band-pass filter for frequency-to-voltage conversion. Designing the present FVC using a band-pass filter is mainly to utilize both attenuation bands of this type of filter, which allows to extend the frequency of operation of the present FVC system. The filter stage components L, C, and R values of the designed PCB FVC system are chosen to be 20 uH, 220 pF, and 1.5 k Ω, respectively. The diode used in the peak detector stage is a fast-switching Schottky diode, and with around 0.25V forward voltage drop. The capacitor CL and Resistance RL values 10 nF and 5.1MΩ, respectively. The filter parameters from (2)-(5) based on the values of the components are as follows: $f_0$=2.4 MHZ, $f_{c1}$=464.23 kHz, $f_{c2}$=12.40 MHz, BW=11.94 MHz, and Q=0.201. One way to differentiate between the low and high frequency bands is that at frequencies lower than $f_o$, and only by observing the output of the filter, the output attenuated signal phase would be between 0 and 90 degrees shifted. On the other hand, at frequencies higher than $f_o$, the output attenuated signal phase would be between 0 and '90 degrees shifted. Depending on the frequency of operation, one could intuitively determine which frequency band the system is operating. Hence, observing the phase shift would not be a critical issue. Moreover, this issue could be easily solved by implementing this technique to other types of filters, such as low-pass or high-pass, instead of band-pass filters.

Figure 7:
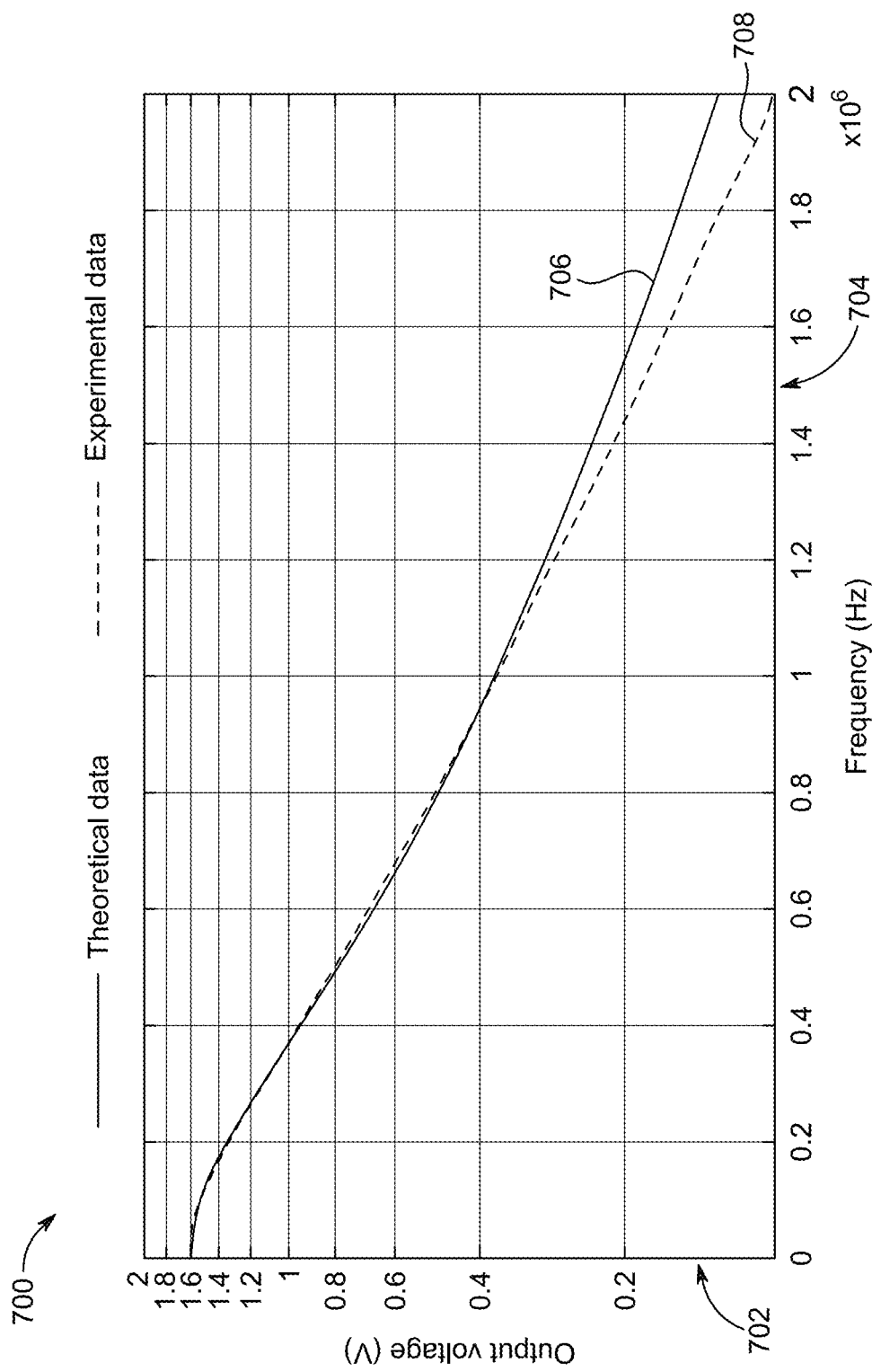
FIG. 7 depicts a graph of measured output DC voltage versus sinusoidal signal frequency, according to certain embodiments.

FIG. 7 depicts a graph 700 of measured output DC voltage 702 versus sinusoidal signal frequency 704, according to certain embodiments. The results are expected to give the behavior of a BPF that is amplitude attenuation in the high band as the frequency. FIG. 7 shows the experimental 706 and theoretical 708 behavior matching, when plotting the frequency 704 of the input signal on the x-coordinate in a linear scale, and a base-10 logarithmic scale for the output DC voltage level 702 in the y-coordinate, proving the filters approach for frequency-to-voltage conversion. However, extending the present FVC to higher frequencies might require replacing PTH components with surface-mount devices (SMDs), that is due to the low switching speeds of the available PTH diodes. By modeling the response of the present system, a simple approximate and general equation in (8) is derived, relating the output DC voltage level ($V_{out}$) to the frequency (ω)=2πf) and the input signal (Vin), where either $V_{out}$, ω or $V_{in}$ variables can be predicted easily using equation (8) by keeping two of these variables fixed, which is usually the case. Also, $V_D$ is the voltage drop across the diode, which would typically be fixed to a certain value. This value might sometimes vary with the frequency of the input signal, depending on the diode model used and the system parameters, leading to small errors that should be taken into account prior to the design.

$$V_{OUT} = \frac{\left(\frac{R}{L}\omega\right)\sqrt{\left(\frac{R}{L}\omega\right)^2 + \left(\frac{1}{LC} - \omega^2\right)^2}}{\omega^4 + \omega^2\left(\left(\frac{R}{L}\right)^2 - \frac{2}{LC}\right) + \left(\frac{1}{LC}\right)^2} V_{in} - V_D. \qquad \text{Eq. (8)}$$

Figure 8A:
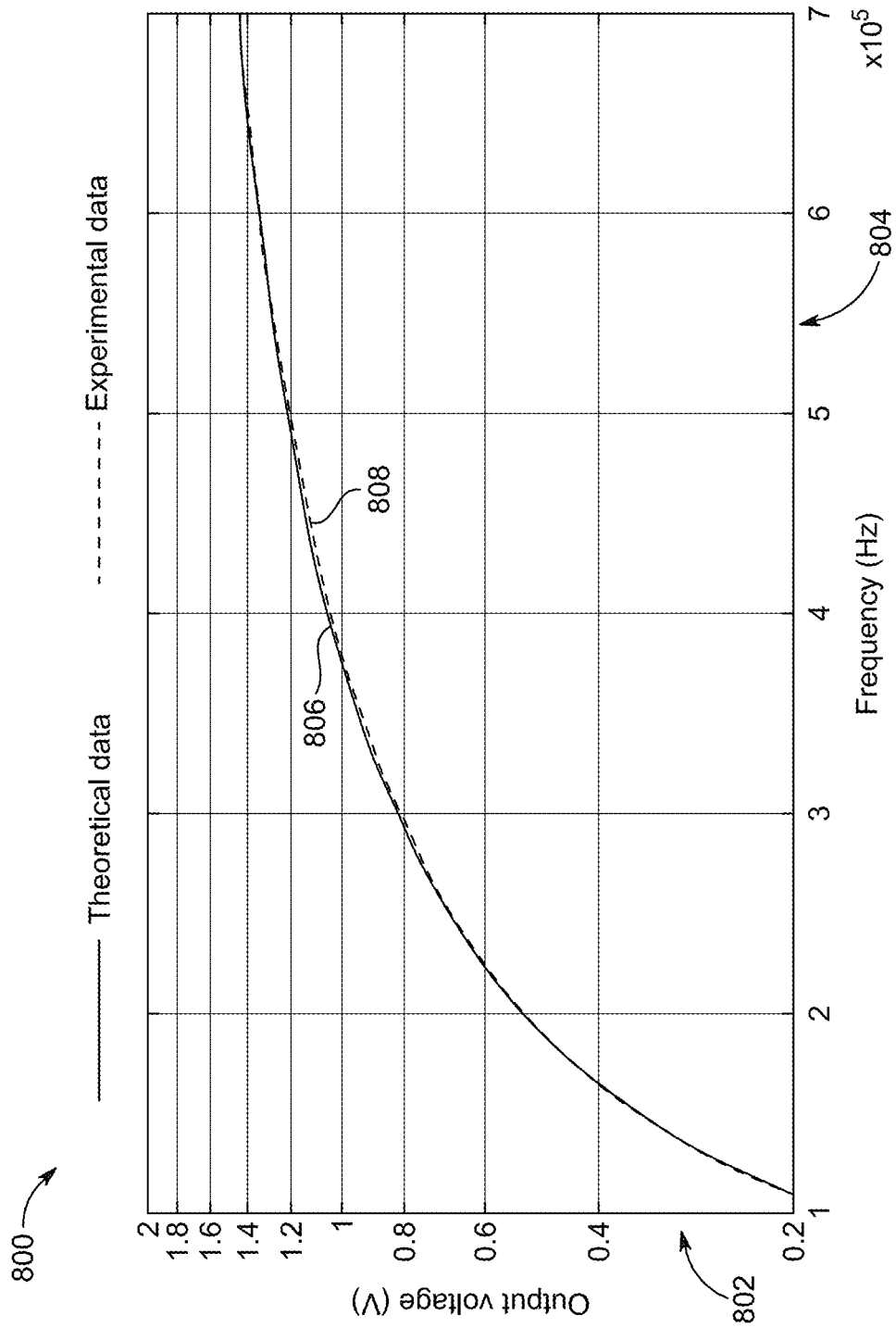
FIG. 8A depicts a graph of low frequency band measurements, according to certain embodiments.
Figure 8B:
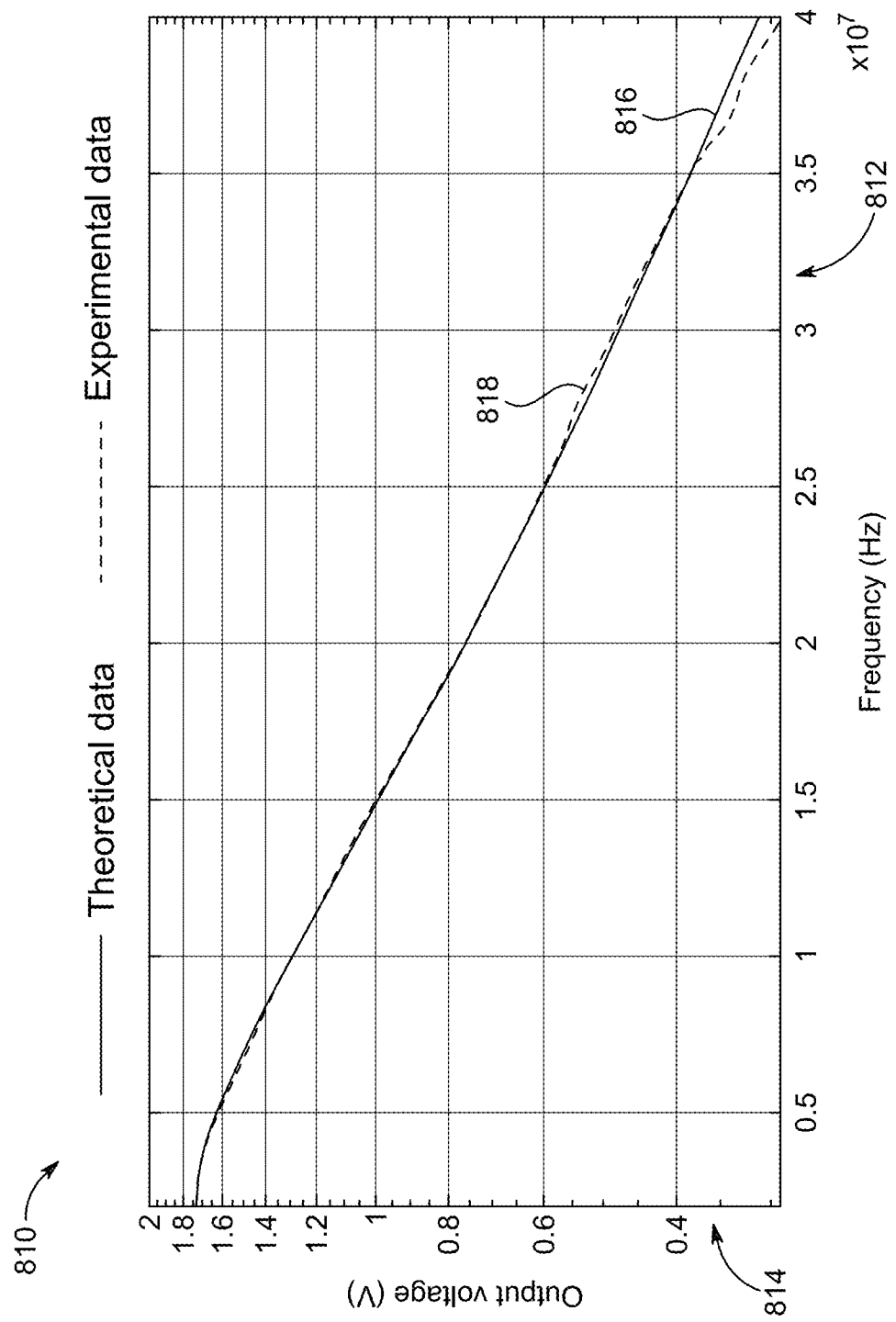
FIG. 8B depicts a graph of high frequency band measurements, according to certain embodiments.

FIG. 8A depicts a graph of measured 806 and the theoretical 808 results at low frequency bands 800, obtained by plotting the frequency 804 of the input signal on the x-coordinate in a linear scale, and a base-10 logarithmic scale for the output DC voltage level 802 in the y-coordinate. FIG. 8B depicts a graph of measured results 816 and theoretical 818 results at high frequency bands 810, obtained by plotting the frequency 812 of the input signal on the x-coordinate in a linear scale, and a base-10 logarithmic scale for the output DC voltage level 814 in the y-coordinate. The two bands outputs almost perfectly match with each other, ranging from 100 kHz to $f_o$ at 2.4 MHz in the low-frequency band, and from $f_o$ to 40 MHz in the high-frequency band. The ripple voltage in the low band is minimal, and gets diminished as the frequency of the input signal goes beyond 1 MHz. Intuitively, combining these two separate responses of the same FVC constructs the regular bell-curve shape of band-pass filters. Although the relation between the output voltage and the input frequency is not linear, but the equation (8) directly relates these two parameters with minimal discrepancy. This response gives a clear hint on the applicability of the present FVC system. Also, diodes with shorter recovery time would ensure faster switching and enhance the performance of the system, especially at high frequencies. Furthermore, adding a separate voltage source to bias the diode diminishes the need for high amplitude input sinusoidal signal.

Figure 9:
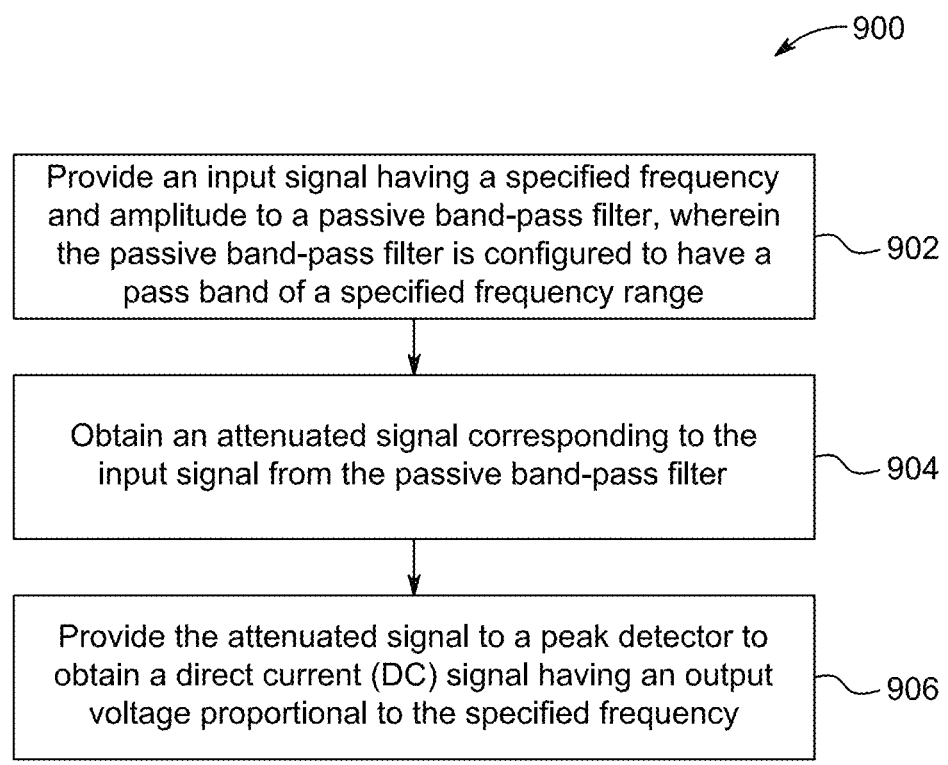
FIG. 9 depicts a flowchart of a method for converting an input frequency to a voltage signal using a passive band-pass filter, according to certain embodiments.

FIG. 9 depicts a flowchart of a method for converting an input frequency to a voltage signal using a passive band-pass filter, according to certain embodiments. At step 902, an input signal having a specified frequency and amplitude is provided to a passive band-pass filter. The passive band-pass filter is configured to have a pass band of a specified frequency range. In an implementation, providing the input signal to the passive band-pass filter includes configuring the passive band-pass filter with a resistor connected in parallel to an inductor and capacitor connected in series. In an implementation, providing the input signal to the passive band-pass filter includes configuring components of the passive band-pass filter to provide the pass band in a range of 100 KHz-40 MHz. In an implementation, providing the input signal to the passive band-pass filter includes providing a voltage to bias a rectifier of the peak detector and reducing the amplitude of the input signal. At step 904, an attenuated signal is obtained corresponding to the input signal from the passive band-pass filter. At step 906, the attenuated signal is provided to a peak detector to obtain a direct current (DC) signal having an output voltage proportional to the specified frequency. In an implementation, providing the attenuated signal to the peak detector includes configuring components of the peak detector to reduce a ripple factor of the output voltage. The ripple factor is indicative of a fluctuation in the output voltage. In an implementation, configuring the components of the peak detector includes adjusting a value of at least one of a capacitor or a resistor of the peak detector to reduce the ripple factor. In an implementation, the amplitude of the input signal is greater than a forward biasing voltage of a rectifier of the peak detector.

The present technology provides a technique to merely utilize simple passive filters to convert sinusoidal signals frequencies to the corresponding voltage levels without using complex circuitry. This technology focuses on using sinusoidal signals as the input signal, and exploiting their response when they pass through a band-pass filter (BPF) as the frequency changes. The present method could work on any type of filters (e.g., LPF, High-pass filter (HPF), etc.). Choosing a BPF in this technology is only for demonstration purposes, and to manifest the applicability of this method in the low and high-frequency bands. The present FVC has the simplest structure and the lowest ripple voltage compared to the reported designs. The present FVC achieves high operating frequencies using mere discrete components without the need of a supply voltage. This disclosure provides a frequency-to-voltage converter characterized by simplicity, wide range of operation, ultra-low power consumption and minimal voltage ripple. The method of the present technology proves to be sufficient for operating at high frequencies. Promising results are manifested, as the system works perfectly with noticeable voltage differences as the frequency varies, and could be read easily. One disadvantage of this approach is that it is only feasible for sinusoidal signals. Another disadvantage is the amplitude dependency, as the output also varies with the input signal amplitude with a fixed ratio. Moreover, these setbacks are also found in the literature for various FVCs with some degree of trade-offs. The disclosure provides an approach for converting the frequency into a DC output voltage of sinusoidal signals. The frequency-to-voltage conversion is achieved by utilizing the attenuation band of a filter. The technology provides a clear mathematical model and a relation between frequency and DC output voltage levels, with merely passive components for efficient power consumption. The present technology is implemented to achieve wide frequency spectrum conversion that could extend to tens of MHz and beyond. The present technology is verified experimentally in both low-frequency range, varying in sub-kilohertz, and as high as 40 MHz.

Numerous modifications and variations of the present disclosure are possible in light of the above teachings. It is therefore to be understood that within the scope of the appended claims, the invention may be practiced otherwise than as specifically described herein.

The invention claimed is:

1. A method for converting an input frequency to a voltage signal using a passive band-pass filter, the method comprising:
providing an input signal having a specified frequency and amplitude to a passive band-pass filter, wherein the passive band-pass filter is configured to have a pass band of a specified frequency range, and the specified frequency of the input signal is out of the pass band of the passive band-pass filter;
obtaining an attenuated signal corresponding to the input signal from the passive band-pass filter; and
providing the attenuated signal to a peak detector to obtain a direct current (DC) signal having an output voltage proportional to the specified frequency.

2. The method of claim 1, wherein providing the input signal to the passive band-pass filter includes configuring the passive band-pass filter with a series inductor, a series capacitor, and a parallel resistor.

3. The method of claim 1, wherein providing the input signal to the passive band-pass filter includes:
configuring components of the passive band-pass filter to provide the pass band in a range of 100 Khz-40 MHz.

4. The method of claim 1, wherein providing the attenuated signal to the peak detector includes:
configuring components of the peak detector to reduce a ripple factor of the output voltage, wherein the ripple factor is indicative of a fluctuation in the output voltage.

5. The method of claim 4, wherein configuring the components of the peak detector includes:
adjusting a value of at least one of a capacitor or a resistor of the peak detector to reduce the ripple factor.

6. The method of claim 1, wherein the amplitude of the input signal is greater than a forward biasing voltage of a rectifier of the peak detector.

7. The method of claim 1, wherein providing the input signal to the passive band-pass filter includes:
providing a voltage to bias a rectifier of the peak detector; and
reducing the amplitude of the input signal.

8. A method for converting an input frequency to a voltage signal using a passive filter, the method comprising:
providing an input signal having a specified frequency and amplitude to a passive filter, wherein the passive filter is configured to attenuate the input signal based on the specified frequency being out of a pass band of the passive filter;
obtaining an attenuated signal corresponding to the input signal from the passive filter; and
providing the attenuated signal to a peak detector to obtain a direct current (DC) signal having an output voltage proportional to the specified frequency.

9. The method of claim 8, wherein providing the input signal to the passive filter includes:
providing the input signal to at least one of a low-pass filter, high-pass filter or a band-pass filter.

10. The method of claim 8, wherein providing the input signal to the passive filter includes:
configuring components of the passive filter to provide the pass band in a range of 100 KHz-40 MHz.

11. The method of claim 8, wherein providing the attenuated signal to the peak detector includes:
adjusting a value of at least one of a capacitor or a resistor of the peak detector to reduce a ripple factor of the output voltage, wherein the ripple factor is indicative of a fluctuation in the output voltage.

12. The method of claim 8, wherein the amplitude of the input signal is greater than a forward biasing voltage of a rectifier of the peak detector.

13. The method of claim 8, wherein providing the input signal to the passive filter includes:
providing a voltage to bias a rectifier of the peak detector; and
reducing the amplitude of the input signal.

14. An apparatus for converting an input frequency to a voltage signal using passive circuitry, the passive circuitry comprising:
a first circuit to:
receive an input signal having a specified frequency and amplitude, the specified frequency of the input signal being out of a pass band of the first circuit, and
output an attenuated signal corresponding to the input signal; and
a second circuit to convert the attenuated signal to a direct current (DC) signal having an output voltage proportional to the specified frequency.

15. The apparatus of claim 14, wherein the first circuit includes a passive filter, wherein the passive filter is configured to attenuate the input signal based on the specified frequency satisfying a specified frequency criterion.

16. The apparatus of claim 15, wherein the passive filter is a passive band-pass filter that is configured to attenuate the input signal based on the specified frequency being outside of a specified frequency range.

17. The apparatus of claim 14, wherein the second circuit is a peak detector that is configured to detect a peak voltage of the attenuated signal.

18. The apparatus of claim 17, wherein the peak detector is configured to reduce a ripple factor of the output voltage, wherein the ripple factor is indicative of a fluctuation in the output voltage.

19. The apparatus of claim 18, wherein the peak detector includes a resistor and a capacitor, and wherein at least one of the capacitor or resistor values is adjusted to reduce the ripple factor.

20. The apparatus of claim 17, wherein the peak detector further comprises:
a voltage source to bias a rectifier of the peak detector.

* * * * *